(12) United States Patent
Arquie et al.

(10) Patent No.: US 6,952,208 B1
(45) Date of Patent: Oct. 4, 2005

(54) METHOD FOR DISPLAYING SUPERSETS OF NODE GROUPS IN A NETWORK

(75) Inventors: Louis Arquie, Cupertino, CA (US); David Hamilton, Milpitas, CA (US); Kenneth M. Turner, Boulder Creek, CA (US)

(73) Assignee: SANavigator, Inc., Broomfield, CO (US)

( * ) Notice: Subject to any disclaimer, the term of this patent is extended or adjusted under 35 U.S.C. 154(b) by 240 days.

(21) Appl. No.: 09/888,095

(22) Filed: Jun. 22, 2001

(51) Int. Cl.[7] .......................... G06T 11/20; G06F 3/00; G06F 9/00; G06F 17/00; G09G 5/00
(52) U.S. Cl. ...................... 345/440; 345/660; 715/734
(58) Field of Search ............................... 345/440, 734, 345/853, 736, 660, 661; 715/733–736, 738; 709/223, 224, 249, 226

(56) References Cited

U.S. PATENT DOCUMENTS

| | | | |
|---|---|---|---|
| 5,276,789 A | | 1/1994 | Besaw et al. |
| 5,278,951 A | * | 1/1994 | Camacho et al. ............ 345/440 |
| 5,414,809 A | * | 5/1995 | Hogan et al. ................ 345/440 |
| 5,845,270 A | * | 12/1998 | Schatz et al. ................ 345/440 |
| 5,910,803 A | * | 6/1999 | Grau et al. .................. 345/734 |
| 6,014,715 A | | 1/2000 | Stoevhase |
| 6,067,093 A | * | 5/2000 | Grau et al. .................. 345/440 |
| 6,078,324 A | | 6/2000 | Phathayakorn et al. |
| 6,369,819 B1 | | 4/2002 | Pitkow et al. |
| 6,437,804 B1 | * | 8/2002 | Ibe et al. .................... 345/736 |
| 2002/0063704 A1 | * | 5/2002 | Sowizral et al. ............ 345/419 |
| 2002/0063713 A1 | * | 5/2002 | Sowizral et al. ............ 345/440 |

OTHER PUBLICATIONS

Liu, H. & Hockney, D., "Visualization in Network Topology Optimization", ACM 1992, pp. 131-137.*

* cited by examiner

*Primary Examiner*—Sumati Lefkowitz
*Assistant Examiner*—Chante Harrison
(74) *Attorney, Agent, or Firm*—Hensley Kim & Edgington, LLC

(57) ABSTRACT

A method of displaying nodes within a network topology. Using a processor coupled to a display screen, the method involves forming a first layer of a multi-layer representation wherein at least two nodes are represented separately; and grouping the nodes of the first layer into group nodes to form a second layer in the multi-layer representation. In addition, the method groups the group nodes of the second layer into a third layer, the third layer having at least one connected-superset node containing group nodes with nodes connected to each other, and at least one isolated-superset node containing group nodes having nodes isolated from each other. The method displays the superset nodes in the third layer so the connected-superset node is separate from the isolated-superset node and such that the connected-superset node is selectively expandable to display group nodes and connections between the nodes, and the isolated-superset node is selectively expandable to display group nodes of the second layer.

26 Claims, 7 Drawing Sheets

METHOD FOR DISPLAYING SUPERSETS OF NODE GROUPS IN A NETWORK

CROSS-REFERENCES TO RELATED APPLICATIONS

This application is related to U.S. patent application Ser. No. 09/539,350 entitled "METHOD FOR DISPLAYING NODES OF A NETWORK USING A MULTI-LAYER PRESENTATION WHEREIN NODES CAN BE SELECTIVELY COLLAPSED OF EXPANDED," filed Mar. 31, 2000, which is hereby incorporated by reference in its entirety as if set forth in full in the present invention.

BACKGROUND OF THE INVENTION

The present invention relates in general to computer user interfaces and more specifically to a method for rendering node displays in a network topology.

Conventional techniques for rendering node displays in a network topology are well known. The importance of enabling a user to view, via a graphical display, the nodes and connection paths in a network cannot be overemphasized. For example, in a network such as a storage area network (SAN), connection paths between nodes are displayed on the graphical display of a user interface associated with the network. If a problem exists with any of the connections or paths, the problem is quickly detected and rectified. Another example is when a switch within a network malfunctions, the problem is quickly traced to the switch and rectified. In addition, the ability to view networks simplifies tasks such as future upgrades to the network or associated devices.

Conventionally, a graphical display is used to show a given configuration of the layout, wherein every connection path is shown separately. Disadvantageously, the display is static, in that it corresponds to a given layout of the network, and a fixed representation of the display is shown to the users. The display in complex networks having large numbers of connection paths, can become quite confusing to view. Moreover, graph drawing algorithms for creating the displays do not scale well to complex graphs, associated with large networks. The nodes in a complex network can appear barely visible in the display, rendering the view of the overall network topology difficult to interpret by the user. Further yet, when the graphs used to produce the display do not have a simple tree structure, the scalability problem is accentuated because the display of all connection paths at a single time constitutes a complex maze of datapaths which can not be easily simplified for viewing purposes.

In the above-referenced related application, U.S. patent application Ser. No. 09/539,350 entitled "METHOD FOR DISPLAYING NODES OF A NETWORK USING A MULTI-LAYER REPRESENTATION WHEREIN NODES CAN BE SELECTIVELY COLLAPSED OF EXPANDED," filed Mar. 31, 2000, a mechanism was described for grouping nodes for a network and for expanding or collapsing these groups. Examples were given on what these groups can consist of. In addition, U.S. application Ser. No. 09/539,350 describes how the group of nodes can be themselves grouped into a second level of groups, etc.

Although the node expansion method described the above provides for simplified display of networks, there remains a need to distinguish network subsets which are not connected.

BRIEF SUMMARY OF THE INVENTION

A first embodiment of the present invention discloses a method of displaying nodes within a network topology. Using a processor coupled to a display screen, the method comprises, forming a first layer of a multi-layer representation wherein at least two nodes are represented separately; and grouping the nodes of the first layer into group nodes to form a second layer in the multi-layer representation. Further, the method includes grouping the group nodes of the second layer into a third layer, the third layer having at least one connected-superset node containing group nodes with nodes connected to each other, and at least one isolated-superset node containing group nodes having nodes isolated from each other; and displaying the superset nodes in the third layer so the connected-superset node is separate from the isolated-superset node and such that the connected-superset node is selectively expandable to display group nodes and connections between the nodes, and the isolated-superset node is selectively expandable to display group nodes of the second layer.

According to another aspect of the present invention, the step of forming comprises a step of creating a graph of nodes to be displayed in the network as a leaf graph.

According to another aspect of the present invention, the leaf graph includes components and interconnection paths of the network.

According to another aspect of the present invention, the group nodes in the connected-superset node are laid out according to layout rules.

According to another aspect of the present invention, the group nodes in the connected-superset node comprises any one or more of switch groups and host groups.

According to another aspect of the present invention, a layout rule consists of the switch group with the highest connectivity being placed in the center of the connected-superset node, for example.

According to another aspect of the present invention, the connected-superset node is fully expandable while the isolated-superset node is minimized.

According to another aspect of the present invention, the isolated-superset node comprises any one or more of unmapped hubs and isolated switches.

According to another aspect of the present invention, the isolated group node comprises isolated devices other than unmapped hubs.

Figure 1A:
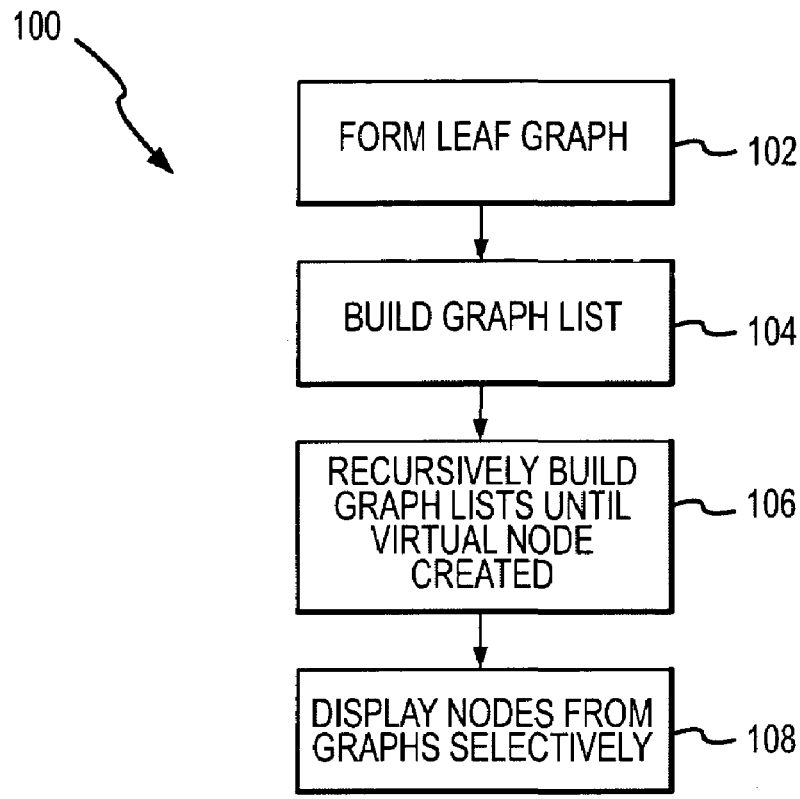
FIG. 1A is a flow diagram of a method for graphically representing a network, such as a SAN, in accordance with an exemplary embodiment of the present invention.

A further understanding of the nature and advantages of the present invention herein may be realized by reference to the remaining portions of the specification and the attached drawings. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Figure 1B:
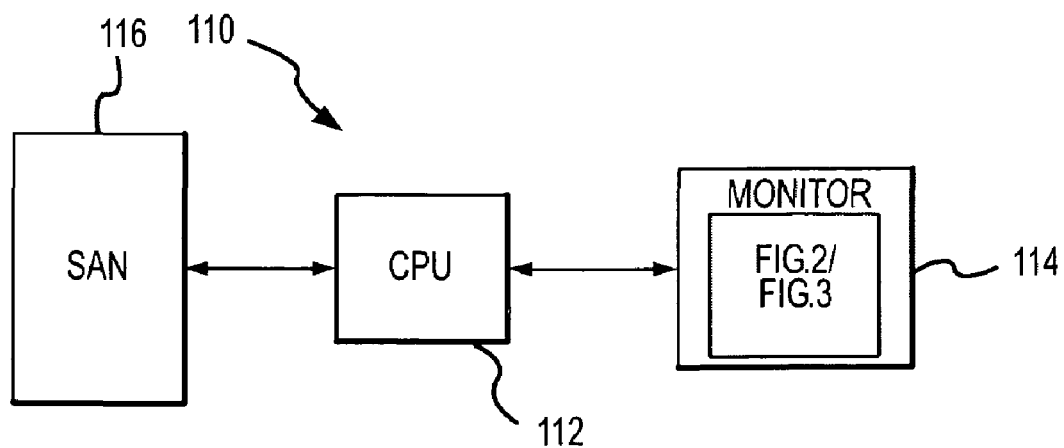
FIG. 1B is a block diagram of network in which the method of FIG. 1A is implemented in accordance with an exemplary embodiment of the present invention.
Figure 2:
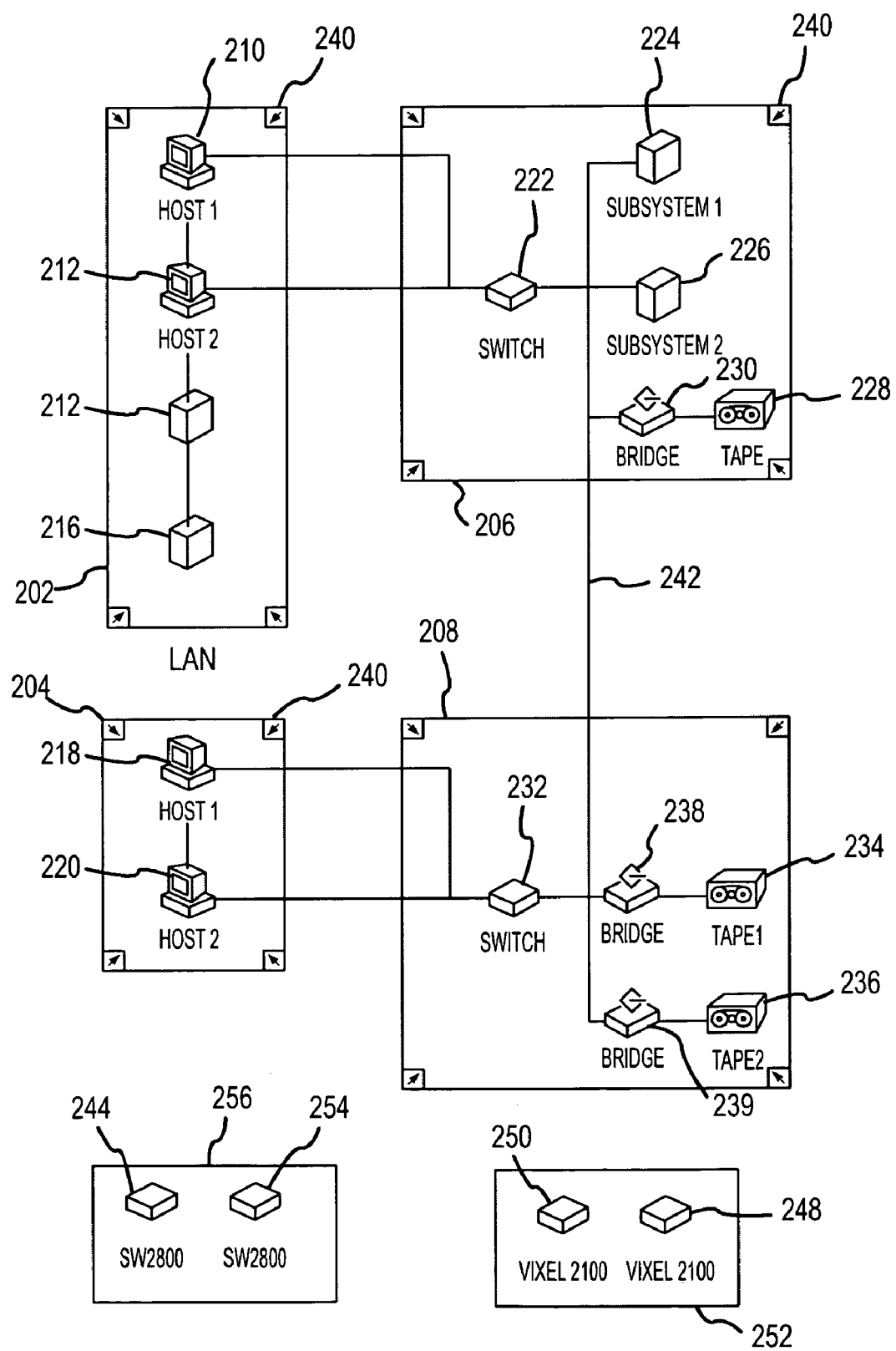
FIG. 2 is a SAN, which can be displayed using a multi-layer representation of the present invention.

FIG. 1A is a flow diagram of a method 100 for graphically representing a network, such as a SAN, in accordance with an exemplary embodiment of the present invention. FIG. 1B is a block diagram of a network 110 in which the method 100 of FIG. 1A is implemented in accordance with an exemplary embodiment of the present invention. The FIG. 1 flow diagram illustrates a methodology which can, for example, be used to display various edges of elements of a network, such as the SAN illustrated in FIG. 2. As referenced herein, an "edge" is any portion of a displayed or undisplayed element, such as a portion of a line used to divide a displayed area into rows, the boundaries used to define each node, and the paths representing connections between the nodes. In accordance with the present invention, the user can selectively display all nodes and connection paths of the network in the manner as shown in FIG. 2. Alternately, the user can selectively collapse any designated portion of the network to simplify the overall display of the network, in a manner as illustrated, for example, with respect to FIG. 3.

Referring to FIG. 1A, a method for displaying nodes and network connections between the nodes, using a multilayer representation of the network, includes a first step 102 of forming a first layer of the multilayer representation with representations of plural nodes. This step represents a discovery phase, whereby information of the physical layout of the network is obtained and assembled into a "leaf graph" format. The leaf graph includes the components and interconnections of the network. The leaf graph can be in any desired format, such as a sublist of all system components, along with interconnection information.

Those skilled in the art will appreciate that the step 102, along with the remaining steps of the FIG. 1A flowchart, can be implemented using a suitably programmed computer 112 of the FIG. 1B apparatus. The computer 112 is connected to a monitor 114 to display the nodes and connection paths of a network, such as the SAN 116.

After forming the leaf graph in step 102 of FIG. 1A, each node of the leaf graph is grouped into a set of group nodes to form a second layer in step 104. As reference herein, a "group node" is a node which can include more than one node. The step of grouping includes building a list of graphs, each graph in the list representing groupings of nodes of the leaf graph. As such, the step of building the graphs begins by grouping the nodes contained within the leaf graph information obtained during the discovery step 102.

Using the information contained in the discovery phase, the nodes of the leaf graph can be grouped in any manner specified by the user. Those skilled in the art will appreciate that the criteria used to group leaf nodes of the leaf graph will vary from application to application. One such grouping for a SAN can include placing nodes of a LAN into a LAN group, and nodes with a switch into a switch group. In the FIG. 1B example, wherein the network is the SAN 116, the display of the SAN layout can be based on the creation of the LAN groups that contain hosts connected together through a LAN connection. Switch groups can be created which contain one switch and all devices connected to that switch through connections, such as fiber connections, with the exception of switches that are part of separate groups and hosts that are part of LAN groups.

The grouping process can be repeated in step 106 of FIG. 1A to recursively build graphs by grouping nodes from a prior graph until a graph is built which contains a single group node. That is, after grouping nodes of the leaf graph into desired groups, the grouped nodes can then be regrouped in a next layer and so on. For example, the grouped nodes can be grouped into a next layer having one or more connected-superset nodes containing all nodes connected to each other, and one or more isolated-superset nodes containing all isolated devices on the network. This can be repeated until a single node, referred to herein as a virtual node of a virtual graph containing a single node, has been formed. Those skilled in the art will appreciate that the virtual node can be used solely in producing the multilayered representation and that the virtual node is never displayed. Alternatively, the virtual node can be a single node representation of the network which is available for display.

In step 108, the nodes and group nodes can be selectively displayed. That is, any group node of the second layer, immediately above the first layer represented by the leaf graph, can be selectively expanded to display nodes contained in the leaf graph which correspond to the group node, while continuing to display connections of the displayed nodes to the remaining group nodes of the second layer which have not been expanded. This is better illustrated by comparing FIGS. 2 and 3. FIG. 2 corresponds to a leaf graph of the FIG. 1B SAN 116. As shown in FIG. 2, the SAN includes a first LAN 202, a second LAN 204, a first switch group 206, a second switch group 208, an isolated switch group 256 and an unmapped hub group 252. The first LAN 202 includes four hosts labeled 210, 212, 214 and 216, respectively. The second LAN 204, which can, for example, be a remote LAN, includes hosts 218 and 220, respectively. The first switch group 206 includes a single switch 222 which interconnects hosts of the first LAN 202 with various system components. In the FIG. 2 example, these system components include subsystems 224, 226, and a tape 228 connected via a bridge 230 to the switch 222, and components of the second switch group 208. The second switch group 208 includes a single switch 232, and associated system components represented by tapes 234, 236 connected to switch 232, via bridges 238 and 239, respectively. The various system components associated with the switch groups 206 and 208 are shown having potential connections to components of the other switch group (e.g., the various system components of the first switch group 206 are connected via a connection 242 to the switch 232). The isolated switch group 256 comprises a switch 244 and a switch 254 both of which are isolated from all other devices in the network. The unmapped hub group 252 contains a hub 250 and a hub 248 which are not mapped to any devices in the network.

In accordance with a first embodiment of the present invention, a displayed representation of a group node of the second layer in the multilayer representation can be selectively expanded to display nodes contained in the first layer, and a displayed representation of nodes in the first layer can be selectively contracted to display group nodes of the second layer. In an alternate embodiment, a displayed representation of superset nodes of group nodes of a third layer in the multilayer representation can be selectively expanded to display group nodes contained in the second layer, and a displayed representation of group nodes in the second layer can be selectively contracted to display superset nodes of the third layer.

Figure 3:
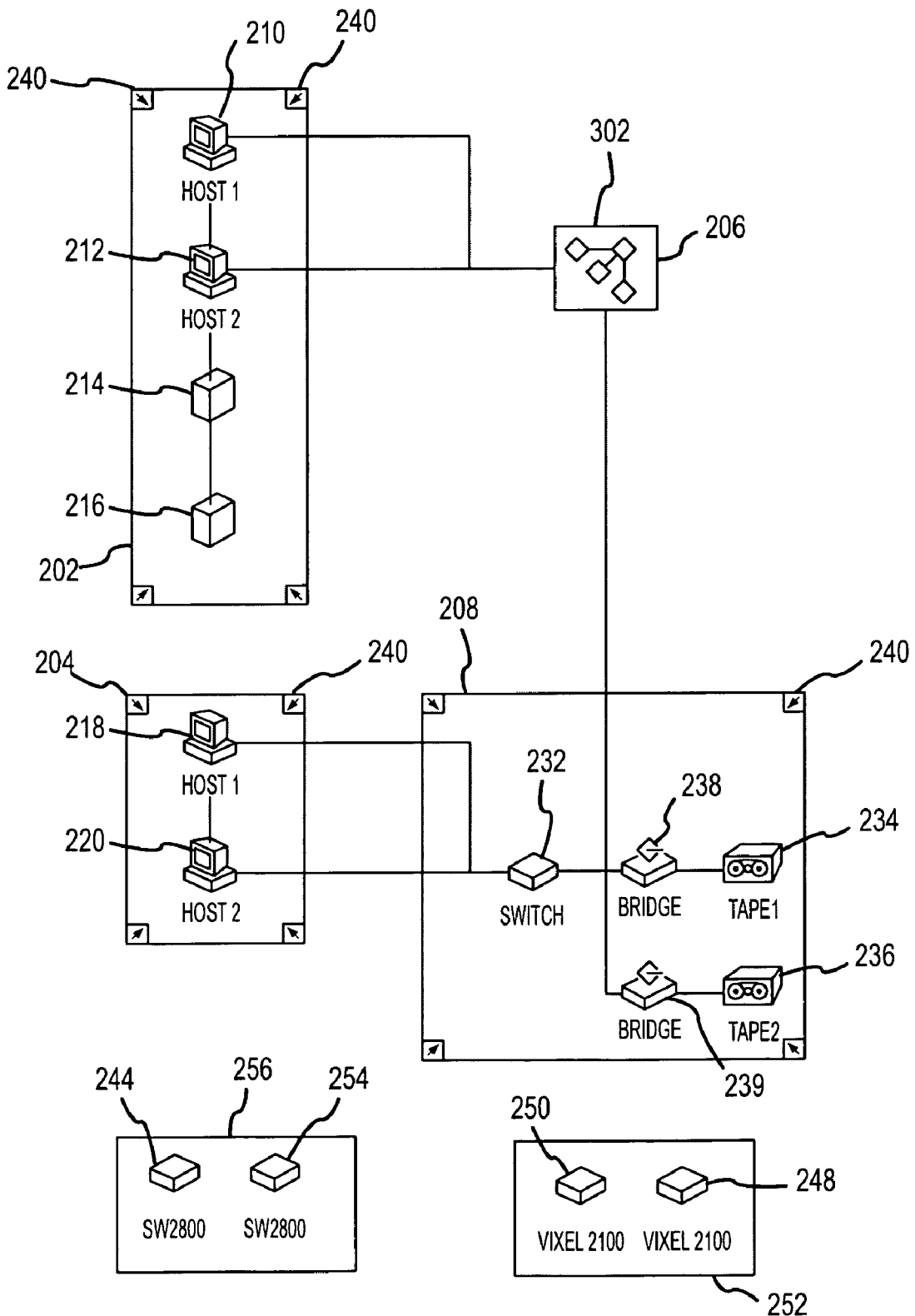
FIG. 3 is the SAN of FIG. 2 with a single group node minimized.

Referring to FIG. 3, only the first switch group 206 has been contracted to simplify the display of the SAN for the user. Exemplary embodiments maintain a single line of nodes in the expanded group so that straight edges can be maintained between the various nodes and other contracted group nodes. As the number of items in the group increases, multiple vertical lines of nodes represented as objects can be used as desired. However, those skilled in the art will appreciate that any desired representation of the various expanded and contracted nodes can be used in accordance with exemplary embodiments of the present invention.

In accordance with exemplary embodiments, contraction of any expanded group node can be achieved by, for example, a cursor moved by key activation of a keyboard and/or movement of a mouse-type device. For example, placement of a cursor within the boundaries of the second LAN 204 as shown in FIG. 2, or within boundaries of designated areas such as areas 240, and clicking a button on the mouse, can be used to contract the displayed representation of the second LAN 204 into a single icon as shown in FIG. 3 for first switch group 206. Similarly, where the user wishes to see an expanded representation of a group node, placement of the cursor within the boundaries of the single group node icon 302, and activation of a mouse key, can be used to expand the group node back to its original expanded shape of FIG. 2.

Of course, a multiple number of layers in excess of two can be used to represent any particular node or superset node (can include plural sub-group nodes). In this case, the process of placing the cursor within the boundaries of a group node to expand the group node into its subgroup nodes can be repeated to select a certain subgroup from the expanded set and selectively expanding it. This process can be repeated until nodes of a leaf graph have been obtained. The designated areas 240 constitute an indication within the displayed representation of any set of nodes or group nodes that the group can be contracted. Where a set of group nodes have been contracted to the greatest extent possible for a given multilayer representation, an indication (such as the absence of any block around the group nodes) can be used to signify to the user that no further contraction is possible. For example, note the absence of any larger block which encompasses the group node icon 302 of FIG. 3. This can, of course, be changed during a set up phase in accordance with the present invention by adding a displayable layer in the multilayer representation directed to desired groupings of group nodes. Further details regarding an exemplary methodology for displaying nodes and group nodes will be provided by reference to FIG. 4A.

Figure 4A:
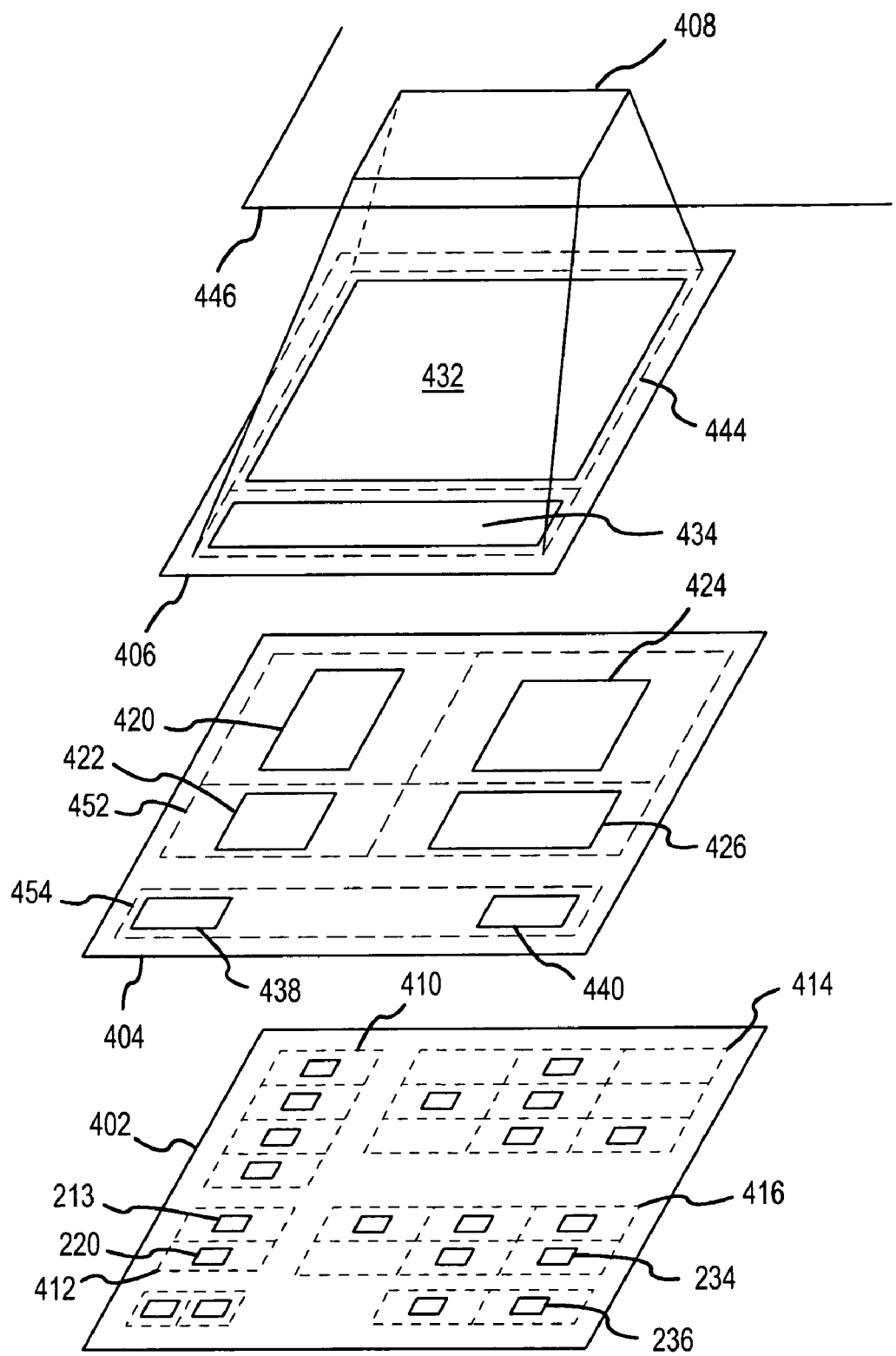
FIG. 4A is a multi-layered representation for displaying nodes, group nodes and superset nodes in accordance with a first embodiment of the present invention.

FIG. 4A is a multi-layered representation for displaying nodes, group nodes and superset nodes in accordance with a first embodiment of the present invention. In FIG. 4A, graphs which have been built in a direction from the leaf graph layer 402 to a top graph layer 446 are laid out. For each graph, grids are created and populated in a direction from the top graph to the leaf graph. That is, FIG. 4A shows the SAN of FIG. 2 after it has been subjected to a layout process. As shown in FIG. 4A, the top graph is a "virtual" graph because it contains a single group node, represented as a virtual node 408 which need not be actually displayable, but which is used in the layout process. The nodes from a leaf graph layer 402 which are associated with the LAN's 202 and 204, switch groups 206 and 208, isolated switch group 256 and unmapped hub group 252 have been grouped into group nodes that are laid out in a second layer represented as a simple group graph layer 404. The process of recursively building graphs is performed until the layout of all graphs has been completed.

The layout process begins by creating a grid for each group node in the list, starting with the top graph 446. Each grid is then populated, starting with the top graph, using nodes from a subsequent graph. That is, a single grid 444 (layer 406) associated with the virtual node 408 is populated with group nodes associated with the graph of the simple group graph layer 406. Grids are then created for each of the two group nodes in the simple group graph layer 406. The two grids labeled 452, 454 in layer 404 correspond to the two superset nodes labeled 432, 434, respectively, of the simple group graph layer 406.

Similarly, grids are created for each of the four group nodes in the simple group graph layer 404. The four grids labeled 410, 412, 414 and 416 (layer 402) correspond to the four group nodes labeled 420, 422, 424 and 426, respectively, of the simple group graph layer 404. Thus, FIG. 4A, includes seven grids, one grid which corresponds to the virtual node 408, two grids for the superset nodes and four grids which correspond to each of the group nodes. The process of creating a grid is repeated recursively until nodes of the leaf graph have been used to populate a grid associated with a simple group graph layer. These steps are more particularly described with reference to FIG. 4B. The process of creating the grids, and a UML (universal modeling language) representation for implementing the creation of the grids, the population of the grids, and the computation of element sizes so that the network can be selectively displayed as nodes, group nodes or any combination thereof, are further described in the co-pending related application U.S. patent application Ser. No. 09/539,350 entitled "METHOD FOR DISPLAYING NODES OF A NETWORK USING A MULTI-LAYER REPRESENTATION WHEREIN NODES CAN BE SELECTIVELY COLLAPSED OF EXPANDED," filed Mar. 31, 2000.

Figure 4B:
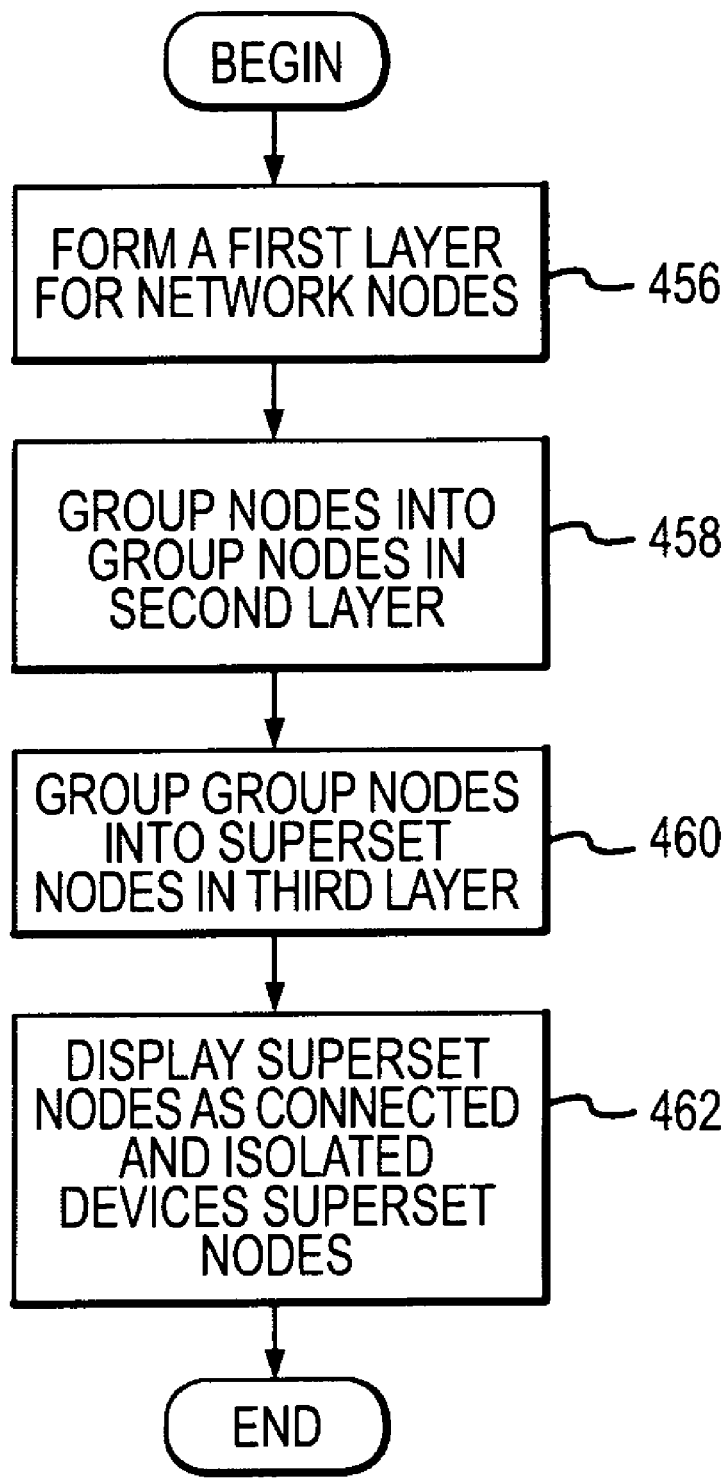
FIG. 4B is flow diagram showing steps for displaying nodes, group nodes and superset nodes in accordance with the multilayered representation of FIG. 4A.

FIG. 4B is flow diagram for displaying nodes, group nodes and superset nodes in accordance with the multi-layer representation of FIG. 4A.

In FIG. 4B, at block 456, the method involves forming layer 402 (FIG. 4A) for the the multi-layered representation. Layer 402 consists of two or more nodes 213, 220, 234, 236 for example, each node being represented separately.

At block 458, the method involves grouping the nodes of layer 402 into group nodes to form layer 404 (FIG. 4A) in the multi-layer representation. Such group nodes may includes LAN groups, switch groups, host groups, loop groups, unmapped hub groups, isolated device groups, etc. without limitation.

At block 460, the group nodes of layer 404 are grouped into layer 406 (FIG. 4A). Layer 406 contains superset nodes (or fabrics) containing group nodes from the prior layer. As implied by its name, a connected-superset node 432 in layer 406 contains group nodes having nodes connected to each other. Group nodes 420, 422, 424, and 426 of layer 404 are contained within connected-superset node 432. As used herein, a connected-superset node contains a subset of all devices connected to each other, i.e., if a node is connected to any node in a superset node, it is part of that superset node, otherwise if the node is not connected to any node in that superset node but is connected to other nodes, it is part of a different superset node consisting of that node and all the other nodes it is connected to.

A further type of superset node is isolated device superset node 434 of FIG. 4A. It consists of all devices discovered in the network that are not connected to any other device. For example, superset node 434 has group nodes 438, and 440 of layer 404. Two different types of devices are part of isolated-device superset node 434: devices that are truly isolated, and devices that seem to be isolated due to a lack of information gathered during the discovery phase. This second type of "isolated" device can be mapped by the user to any one of the connected-superset nodes.

At block 462, the method involves displaying the superset nodes of layer 406 so connected-superset node 432 is separate from isolated-superset node 434. Moreover, connected-superset node 432 is expandable to display group nodes 420, 422, 424, 426 of layer 404 including connections between the group nodes and connections between nodes within each group node. Contrawise, it is collapsible into a single icon as more clearly shown in FIG. 5A. Similarly, isolated-device superset node 434 is collapsible as shown in FIG. 5A, and may be expanded to display group nodes 438, 440 (layer 404).

Figure 5A:
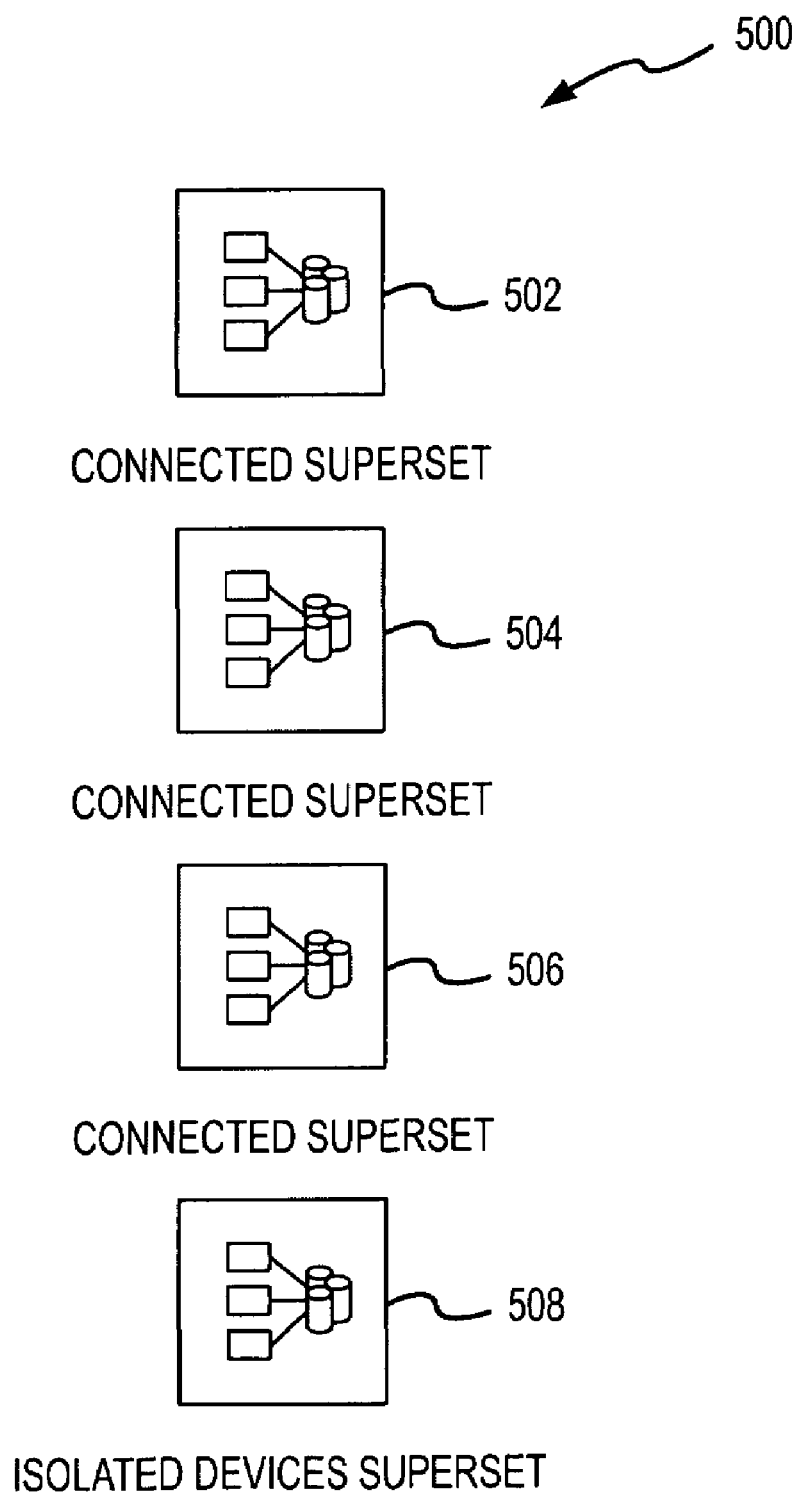
FIG. 5A is a user interface 500 displaying the SAN 116 of FIG. 1B in accordance with a first embodiment of the present invention.

FIG. 5A is a user interface 500 displaying the SAN 116 of FIG. 1B in accordance with a first embodiment of the present invention. SAN 116 is shown as collapsed icons representing three connected-superset nodes 502, 504, 506 and an isolated device superset node 508. Each of connected-superset nodes 502, 504, 506 contain group nodes having nodes. The nodes of each connected-set are coupled to each other but not to nodes belonging to other superset nodes, as discussed with reference with FIG. 4B. For example, connected-superset node 502 consists of all nodes connected to each other but not coupled to nodes of connected-superset nodes 504 and 506. Similarly, all nodes connected to each other but not coupled to nodes of connected-superset nodes 502 and 506 belong to connected-superset node 504, etc. This is more clearly shown with reference to connected-superset node 502B of FIG. 5B which has been expanded.

Isolated-device superset node 508 consists of group nodes having devices not coupled to any other device. For example, a group node within isolated-device superset node 508 contains all isolated switches on the network. A second group node may contain all unmapped hubs discovered in the network, for example. Again this is more clearly illustrated with respect to isolated device-superset node 508B of FIG. 5B which has been expanded.

Figure 5B:
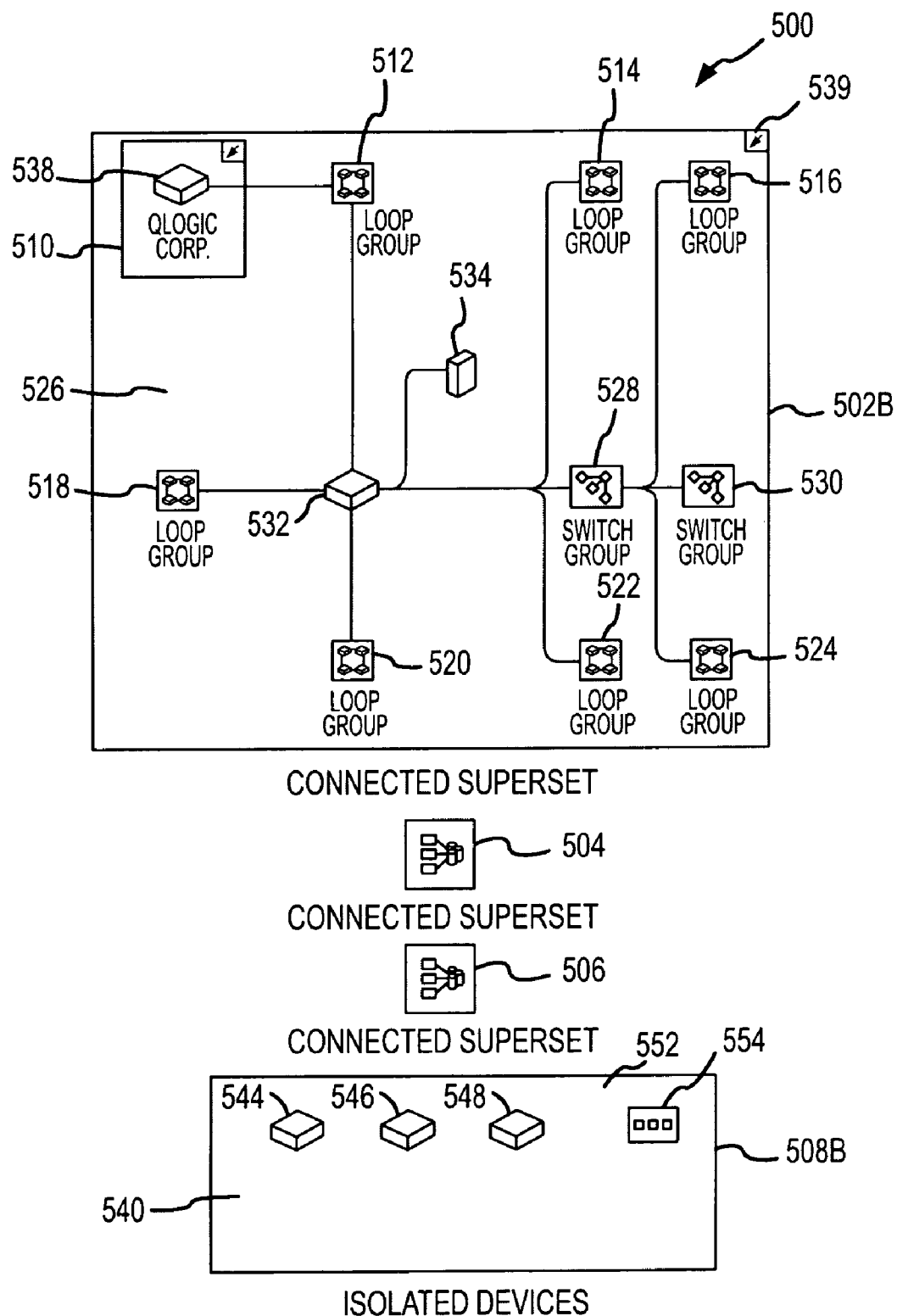
FIG. 5B is a partially expanded representation of the user interface 500 of FIG. 5A.

FIG. 5B is a partially expanded representation of the user interface 500 of FIG. 5A.

In FIG. 5B, connected-superset node 502B and isolated-device superset node 508B are expanded. That is, connected-superset node 502B is an expanded representation of connected-superset node 502 of FIG. 5A. Similarly, isolated-device superset node 508B is an expanded representation of isolated-device superset node 508 of FIG. 5A. As shown, other connected-superset nodes 504, 506 remain collapsed in both FIGS. 5A and 5B.

In operation, a user wishing to expand connected-superset node 502 employs an input device such as a mouse to double click the connected-superset node 502 (FIG. 5A) representation. This results in the display of connected-superset node 502B (FIG. 5B) having collapsed representations of loop groups 512, 514, 516, 518, 520, 522 and 524. Each loop may be expanded to display the components within the particular loop group. Also, switch groups 526, 528 and 530 are contained in connected-superset node 502B. As with the loop groups, the switch groups may be expanded to display their devices. For example, switch group 526 when expanded, displays a switch 532 and a node 534. A host group 510 containing a node 538 is also shown. Each of the aforementioned groups may be alternately expanded and collapsed as needed. This is also the case for connected-superset node 502B which is expandable and collapsible. To collapse connected-superset 502B, a mouse cursor is moved over a designated area 539, followed by double clicking of the mouse button. This action contracts connected-superset node 502B into connected-superset node 502 of FIG. 5A.

The user may wish to view the expanded isolated device superset node 508B as shown by double clicking isolated-device superset node 508 of FIG. 5A. When expanded, an unmapped hub group 540 and an isolated switch group 554 are displayed. The unmapped hub group 540 is expandable to display unmapped hubs 544, 546, 548. Contrawise, by double clicking on a designated area 552, the unmapped hub group 540 is collapsible into a single icon. As shown, the isolated switch group 554 is collapsed and may be expanded to show isolated switches contained therein. It should be noted that with either the connected or the isolated device superset node, the layout can be defined following some rules to make said layout consistent for the user. Examples of layout rules that are applied are: the switch with the highest connectivity can be placed in the center of the connected-superset node, the host group can always be placed as the leftmost group in the connected-superset node, common connected-superset node patterns (mesh, cross-connect, cascade) are always represented in the same way.

In this fashion, the present invention provides a method for displaying superset nodes in a network topology. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method of displaying nodes within a network topology, the method using a processor coupled to a display screen, the method comprising:

forming a first layer of a multi-layer representation wherein at least two nodes are represented separately;

grouping the nodes of the first layer into group nodes to form a second layer in the multi-layer representation;

grouping the group nodes of the second layer into a third layer, the third layer having at least one connected-superset node containing group nodes with nodes communicatively connected to each other, and at least one isolated-superset node containing group nodes having nodes not communicatively connected to each other or to the nodes of the connected-superset node; and displaying the superset nodes in the layer so the connected-superset node is separate from the isolated-superset node to show a lack of connection and such that the connected-superset node is selectively expandable to display group nodes and connections between the nodes, and the isolated-superset node is selectively expandable to display group nodes of the second layer.

2. The method of claim 1, wherein the step of forming comprises a step of creating a graph of nodes to be displayed in the network as a leaf graph.

3. The method of claim 2, wherein the leaf graph includes components and interconnection paths of the network.

4. The method of claim 1 wherein the group nodes in the connected-superset node are laid out according to layout rules.

5. The method of claim 4 wherein the group nodes in the connected-superset node comprises any one or more of switch groups and host groups.

6. The method of claim 5 wherein a layout rule consists of the switch group with the highest connectivity being placed in the center of the connected-superset node.

7. The method of claim 1 wherein the connected-superset node is fully expandable while the isolated-superset node is minimized.

8. The method of claim 1 wherein the isolated-superset node comprises any one or more of unmapped hubs and isolated switches.

9. The method of claim 1 wherein the isolated group node consists of isolated devices other than unmapped hubs and isolated switches.

10. A method of displaying nodes within a network topology, the method using a processor coupled to a display screen, the method comprising:
    forming a first layer of a multi-layer representation wherein at least two nodes are represented separately;
    grouping the nodes of the first layer into group nodes to form a second layer in the multi-layer representation;
    grouping the group nodes of the second layer into a third layer, the third layer having at least one connected-superset node containing group nodes with nodes communicatively connected to each other, but not connected to any other nodes belonging to other connected-superset nodes; and
    displaying the connected-superset node in the third layer in a display such that the connected-superset node is selectively expandable to display group nodes and connections between the nodes in the display.

11. The method of claim 10 wherein grouping the group nodes of the second layer into a third layer further comprises, the third layer having at least one isolated-superset node containing group nodes having nodes isolated from each other; and
    displaying the superset nodes in the third layer so the connected-superset node is separate from the isolated-superset node and such that the connected-superset node is selectively expandable to display group nodes and connections between the nodes, and the isolated-superset node is selectively expandable to display group nodes of the second layer.

12. A computer-based method for graphically displaying a network, comprising:
    forming a first layer of a multilayer representation of the network including representations of a plurality of nodes, the first layer including components and communicative interconnections of the network;
    forming a second layer of the multilayer representation by grouping the plurality of nodes into two or more group nodes based on grouping criteria;
    forming a third layer of the multilayer representation by grouping the group nodes into sets of nodes, wherein the sets of nodes are not communicatively connected; and
    displaying the multilayer representation including the nodes, the group nodes, and the sets of nodes and the interconnections, wherein the group nodes in the second layer can be expanded to selectively display one or more of the plurality of nodes and the sets of nodes in the third layer can be expanded to selectively display one or more of the group nodes in the multilayer representation.

13. The method of claim 12, wherein the grouping criteria are based on functional relationships.

14. The method of claim 13, wherein the functional relationships are defined to not require physical proximity in the network.

15. The method of claim 12, further including during the expansion of the group nodes, continuing to display connections of the displayed nodes to remaining ones of the group nodes that have not been expanded.

16. The method of claim 12, wherein the sets of nodes include a connected-superset node comprising the nodes connected to each other and an isolated-superset node comprising a set of the nodes not connected to other ones of the nodes.

17. A computer program product storing executable instructions on a computer readable medium for performing a programmed process that displays a multi-layer representation of a network topology, the programmed process comprising:
    discovering the network topology to identify nodes and interconnections, wherein each node represents a component in the network topology and each interconnection represents a communicative coupling between at least two components in the network topology, and wherein at least one component is not communicatively coupled to any other component in the network topology;
    forming a first layer of the multi-layer representation to include nodes and interconnections,
    forming a second layer of the multi-layer representation by grouping the plurality of nodes in the first layer into a plurality of group nodes;
    forming a third layer of the multi-layer representation by grouping the plurality of group nodes in the second layer into a plurality of superset nodes, wherein the plurality of superset nodes comprise at least one connected-superset node having associated group nodes with nodes communicatively coupled to each other and at least one isolated-superset node having associated group nodes having nodes not communicatively coupled to each other or to the nodes of the connected-superset node; and
    displaying the plurality of superset nodes of the third layer such that the connected-superset node is separate from the isolated-superset node, wherein the connected-superset node is expandable to display the associated group nodes of the connected-superset node and the isolated-superset node is expandable to display the associated group nodes of the isolated-superset node.

18. The computer program product of claim 17 wherein the displaying operation comprises:
    displaying connections between group nodes and displaying connections between nodes within each group node.

19. The computer program product of claim 17 further comprising:
    displaying the plurality of superset nodes, wherein the connected-superset node is collapsible to display a single representation of the connected superset node and the isolated-superset node is collapsible to display a single representation of the isolated-superset node.

20. The computer program product of claim 17 further comprising:
  displaying the plurality of group nodes of the second layer, wherein the plurality of group nodes are expandable to display the nodes of the first layer that correspond to the respective group node while continuing to display connections between the displayed nodes and unexpanded group nodes.

21. The computer program product of claim 20 further comprising:
  displaying the plurality of group nodes of the second layer, wherein the nodes of the first layer that correspond to the respective group node is collapsible to display a single representation of the group node.

22. The computer program product of claim 17 further comprising:
  creating a first grid for each superset node of the third layer; and
  populating the first grid with group nodes from the second layer.

23. The computer program product of claim 22 further comprising:
  creating a second grid for each group node of the second layer; and
  populating the second grid with nodes from the first layer.

24. The method of claim 1, further comprising:
  discovering the network topology to identify nodes and interconnections, wherein each node represents a component in the network topology and each interconnection represents a communicative coupling between at least two components in the network topology, and wherein at least one component is not communicatively coupled to any other component in the network topology.

25. The method of claim 10, further comprising:
  discovering the network topology to identify nodes and interconnections, wherein each node represents a component in the network topology and each interconnection represents a communicative coupling between at least two components in the network topology, and wherein at least one component is not communicatively coupled to any other component in the network topology.

26. The method of claim 12, further comprising:
  discovering the network topology to identify nodes and interconnections, wherein each node represents a component in the network topology and each interconnection represents a communicative coupling between at least two components in the network topology, and wherein at least one component is not communicatively coupled to any other component in the network topology.

\* \* \* \* \*